Feb. 5, 1946.  H. W. RICE  2,394,105
VALVE
Filed Jan. 22, 1944

WITNESSES:
E. J. Maloney

INVENTOR
H. W. RICE
BY Albert J. Henderson
his ATTORNEY

Patented Feb. 5, 1946

2,394,105

UNITED STATES PATENT OFFICE 2,394,105

VALVE

Harold W. Rice, Lynwood, Calif., assignor to Grayson Heat Control, Ltd., Lynwood, Calif., a corporation of California Application January 22, 1944, Serial No. 519,301

3 Claims. (Cl. 277—20)

This invention relates to valves and, more particularly, to multiple valve members mounted for reciprocation in unison toward and away from their seats.

One object of the invention is to ensure accurate alignment of two or more valve members with their respective valve seats.

Another object of the invention is to apply substantially equal seating pressure to the multiple valve members.

Another object of the invention is to afford self-compensation in the valve structure for unavoidable inaccuracies in manufacture.

Other objects and advantages will become apparent from the following description taken in connection with the accompanying drawing, wherein Fig. 1 is a cross-section of the solenoid operated multiple valve;

Figure 3:
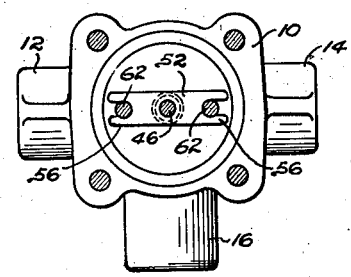
Fig. 3 is a section taken on the line III—III of Fig. 1.
Figure 1:
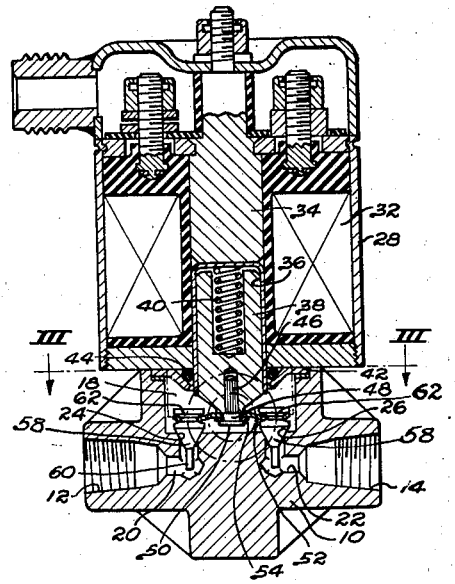
Figure 2:
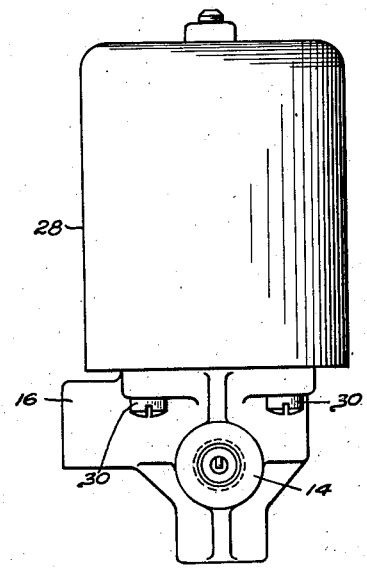
Fig. 2 is a side elevation of the same.

Referring more particularly to the drawing, the structure shown in Fig. 1 comprises a valve body 10 having outlet openings 12 and 14 at opposite ends thereof in substantially axial alignment. An inlet opening 16 is also formed in the body 10 preferably normal to the outlet openings 12 and 14 and substantially midway therebetween. The inlet opening 16 is spaced from the plane of the outlet openings 12 and 14 and opens directly into a valve chamber 18 which is recessed into the body 10 from one end thereof. The outlet openings 12 and 14 communicate with the valve chamber 18 by angular passages 20 and 22 extending to the bottom wall of the valve member 18 and having suitable valve seats 24 and 26 formed at the juncture therewith.

The open end of the valve chamber 18 is closed by the casing portion 28 of a solenoid operator which is secured to the body 10 by means of the screws 30. The solenoid operator may contain the usual coil 32 enclosing a stationary core 34 which abuts the closed end of a cup-shaped container 36. Reciprocable in the container 36 is a plunger 38 of special form which is biased toward the open end thereof by a coil spring 40 mounted in the plunger and engaging the closed end of the container. Entrance of leakage fluid to the solenoid operator is prevented by the provision of a packing retainer 42 secured in a recess between the casing 28 and valve body 10 and containing a suitable packing or sealing ring 44 which extends around the projecting end of the container 36 for the purpose.

The plunger 38 is somewhat longer than the container 36 and projects therefrom into the valve chamber 18 adjacent the bottom wall thereof. The projecting end of the plunger is provided with an axial opening for the reception of one end of a valve stem 46. This end of the valve stem 46 may be knurled or otherwise formed to ensure close fitting and adjoins an enlarged portion 48 of the valve stem defining a shoulder therebetween. The enlarged portion 48 also adjoins a head 50 on the valve stem 46 defining a second shoulder thereon.

The enlarged portion 48 has its shoulder engaged with the end of the plunger 38 and carries a retaining member 52 and a spacing member 54 which together are preferably slightly thinner than the dimension of the enlarged portion 48 between the shoulders thereon. The retaining member 52 is preferably flexible and may comprise a rectangular strip of material having bifurcated ends 56 which may be concavo-convex, as shown in Fig. 1, or may be flat or otherwise suitably shaped.

The ends of the retaining member 52 overlie the valve seats 24, 26, respectively, and are adapted to carry a valve member 58 of duplicate form at each end which cooperates with the valve seat to control the flow of fluid through the passages 20 and 22. The valve members 58 are generally conical in form and each may have a centering pin 60 depending therefrom. The larger end of each of the conical-shaped valve members 58 is formed into a head for engagement with the bifurcated end 56 of the retaining member 52 and for this purpose is provided with a neck portion 62 which is loosely engaged by the bifurcated end 56. Preferably, the neck portion 62 is provided with oppositely disposed ball-faced shoulders thereon spaced one from the other and with which the opposite faces of the bifurcated end portion 56 is adapted for edge contact respectively as the valve stem is reciprocated in one direction or the other. In view of the loose engagement between the bifurcated ends and the neck portions it is apparent that the edge contact will occur first on one shoulder and then on the opposite shoulder of each neck portion as the valve members move away from and engage their seats.

From the foregoing, it will be apparent that movement of the plunger 38 upon energization of the solenoid coil 32 will cause the valve members 58 to become disengaged from the seats 24, 26, thus admitting fluid from the inlet 16 through angular passages 20, 22 to both outlet openings 12 and 14. When the solenoid coil 32 is de-energized, the plunger 38 drops under the bias of spring 40 and by gravity to seat the valve members. Owing to the difference in depth of the retaining member 52 and washer 54 jointly with respect to the enlarged portion 48 of the valve stem, a slight rocking motion of the retaining member 52 on the valve stem is provided for. In addition, the flexibility of the retaining member itself serves to ensure that an equal seating pressure will be applied to the valve members 58. Thus, inaccuracies in manufacture as may involve the use of valve members of slightly different lengths will not affect the accurate seating of the valve members and such seating will occur in unison. Moreover, the edge contact between the valve members 58 and the bifurcated ends 56 of the retaining member 52 provides sufficient freedom between these parts to insure accurate alignment of the valve members with their respective seats. It is apparent, therefore, that with this multiple valve construction there is no danger that a complete shut-off of fluid flow through the multiple ports will not occur when the coil 32 of the solenoid operator is deenergized.

Figure 4:
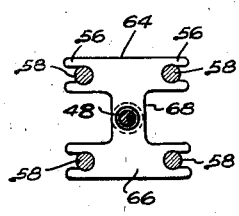
Fig. 4 is a plan of a detail in an alternative form of multiple valve construction.

A modified form of retaining member is disclosed in Fig. 4. In this embodiment, instead of the two valve members disclosed in Fig. 1, four valves are used and the retaining member is modified accordingly. Thus, the outlet openings may be spaced in cruciform relation one with the other in the valve body and four valve members 58 be provided to cooperate therewith. The retaining member 64 in this embodiment is provided with spaced arms 64 and 66 which are connected at their center portion by a transverse arm 68. The transverse arm 68 is perforated for the reception of the valve stem enlarged portion 48 as in the previously described embodiment. The bifurcated ends which are provided on the retaining member 64 may be similar in all respects to those described in connection with Fig. 1. The modified form of retaining member 64 has all the advantages of ensuring accurate alignment of the four valve members with the application of substantially equal seating pressure thereto.

Figure 5:
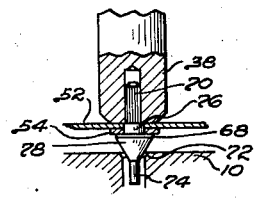
Fig. 5 is a partial section of a detail in a further alternative form of valve construction.

A further modification shown in Fig. 5 takes the form of an additional valve member 68 which is carried by the plunger 38 in place of the valve stem 46 of the previously described embodiment. As in the case of the valve stem, the valve member 68 may be provided with a knurled portion 70 secured in the axial opening in the plunger 38 and may project therefrom into operative engagement with a valve seat 72 formed in the central portion of the valve body 10. The valve seat 72 may communicate with a passage 74 thus providing an outlet in addition to those previously described. As in the case of the valve stem of the previous embodiment, the knurled portion 70 may adjoin an enlarged portion 76 on which the retaining member 52 or 64 may be carried together with the spacing washer 54. Provision for rocking movement of the retaining member 52 or 64 may also be made by the enlarged portion 76 having greater depth than the combined thickness of the retaining member and spacing washer 54. The conical portion 78 of the valve member 68 provides the shoulder upon which spacing washer 54 is seated and thus takes the place of the head 50 described in connection with the previous embodiment.

It will be apparent that many modifications may be made in the arrangement and combination of parts and in the detailed construction herein disclosed within the scope of the appended claims without departing from the spirit of the invention.

I claim:

1. In a valve, an axially reciprocable valve stem, a plurality of separate valve seats spaced radially from the axis of said stem, a plurality of valve members engageable one with each said seat, a reduced portion defining spaced shoulders on said stem, a reduced portion defining spaced shoulders on each valve member, a retaining member having an aperture intermediate the ends thereof in which said reduced stem portion is loosely received for movement of said retaining member between said shoulders on said stem, and bifurcated end portions on said retaining member extending into proximate relation with said reduced portion of each valve member, said valve members being axially reciprocable in unison toward and away from said valve seats and in paths substantially parallel with said valve stem axis by engagement of said bifurcated ends and valve member shoulders, said retaining member having limited rocking movement relative to said stem and said valve members having limited rocking movement relative to said retaining member whereby substantially equal seating pressure is caused to be applied to said valve members and each said valve member may assume concentric relation with its seat upon engagement therewith.

2. A valve comprising a casing having a valve chamber, a plurality of outlet openings and a common inlet opening in said chamber, said outlet openings being spaced radially on opposite sides of one said opening located at the center portion thereof, a valve stem mounted in said casing for reciprocation axially in said valve chamber, a valve member carried axially by said valve stem for engagement with said center outlet, a retaining member secured to said valve stem by said valve member for limited rocking movement thereon, and a plurality of other valve members carried by said retaining member and reciprocable axially in paths substantially parallel with said valve stem axis for engagement with the other said outlet opening simultaneously with the engagement of the first said valve member and center outlet.

3. A valve comprising a casing having a valve chamber, a plurality of outlet openings and a common inlet opening in said chamber, said outlet openings being spaced in cruciform relation one with the other, a valve stem mounted in said casing for reciprocation axially in said valve chamber, a retaining member having spaced arms connected by a transverse portion secured to said valve stem, and a plurality of valve members carried by said spaced arms and reciprocable thereby axially in paths substantially parallel with said valve stem axis for engagement one with each of said outlet openings.

HAROLD W. RICE.